United States Patent
Hatano et al.

(10) Patent No.: US 11,872,993 B2
(45) Date of Patent: Jan. 16, 2024

(54) MOVING BODY CONTROL APPARATUS, MOVING BODY, AND MOVING BODY CONTROL METHOD FOR CONTROLLING A MOVING BODY TO PERFORM AN AUTOMATED LANE CHANGE BASED ON A DRIVER PREPARATION LEVEL

(71) Applicant: HONDA MOTOR CO., LTD., Tokyo (JP)

(72) Inventors: Kunimichi Hatano, Wako (JP); Tadahiko Kanoh, Wako (JP); Yuta Takada, Tokyo (JP); Tsubasa Shibauchi, Tokyo (JP); Shogo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 17/215,381

(22) Filed: Mar. 29, 2021

(65) Prior Publication Data
US 2021/0300387 A1    Sep. 30, 2021

(30) Foreign Application Priority Data

Mar. 30, 2020 (JP) .................................. 2020-059998

(51) Int. Cl.
*B60W 40/09*  (2012.01)
*B60W 30/18*  (2012.01)
(Continued)

(52) U.S. Cl.
CPC ...... *B60W 40/09* (2013.01); *B60W 30/18163* (2013.01); *B60W 50/12* (2013.01);
(Continued)

(58) Field of Classification Search
CPC ................... B60W 30/18163; B60W 2540/229
See application file for complete search history.

(56) References Cited

U.S. PATENT DOCUMENTS

2017/0003683 A1   1/2017  Sato et al.
2017/0313320 A1   11/2017 Asakura et al.
(Continued)

FOREIGN PATENT DOCUMENTS

CN   106314419 A   1/2017
CN   110182210 A   8/2019
(Continued)

OTHER PUBLICATIONS

Office Action dated Jan. 18, 2022 issued over the corresponding Japanese Patent Application No. 2020-059998 with the English translation thereof.
(Continued)

*Primary Examiner* — Jeffrey C Boomer
(74) *Attorney, Agent, or Firm* — Carrier, Shende & Associates P.C.; Joseph P. Carrier; Jeffrey T. Gedeon (57) ABSTRACT

A moving body control apparatus includes a judging section that judges a driving preparation level of an occupant of a moving body; and a lane change control section that approves a first lane change, which is a lane change in which a lane boundary line is crossed once, if the driving preparation level of the occupant is greater than or equal to a first level, and approves a second lane change, which is a lane change in which lane boundary lines are crossed a plurality of times, if the driving preparation level of the occupant is greater than or equal to a second level that is higher than the first level.

12 Claims, 6 Drawing Sheets

(51) Int. Cl.
*B60W 50/14* (2020.01)
*B60W 50/12* (2012.01)
*B60W 60/00* (2020.01)
*G01C 21/34* (2006.01)

(52) U.S. Cl.
CPC .......... *B60W 50/14* (2013.01); *B60W 60/001* (2020.02); *G01C 21/3407* (2013.01); *B60W 2050/146* (2013.01); *B60W 2420/42* (2013.01); *B60W 2420/52* (2013.01); *B60W 2540/30* (2013.01)

(56) References Cited

U.S. PATENT DOCUMENTS

| | | | |
|---|---|---|---|
| 2019/0263262 A1* | 8/2019 | Mimura | B60W 10/20 |
| 2019/0263412 A1 | 8/2019 | Saikyo et al. | |
| 2021/0053565 A1* | 2/2021 | Kim | B60W 30/182 |
| 2021/0061300 A1* | 3/2021 | Adam | B60W 30/12 |
| 2022/0001867 A1* | 1/2022 | Hashimoto | B60W 30/18163 |
| 2022/0063607 A1* | 3/2022 | Daniel | B60W 30/16 |
| 2022/0212689 A1* | 7/2022 | Nakao | G08G 1/0962 |
| 2022/0324473 A1* | 10/2022 | Gläser | B60W 50/08 |

FOREIGN PATENT DOCUMENTS

| | | | | |
|---|---|---|---|---|
| CN | 111783536 A | * | 10/2020 | ......... G06K 9/00798 |
| CN | 109415087 B | * | 1/2022 | ......... B62D 15/0255 |
| DE | 102020117158 A1 | * | 12/2021 | |
| JP | 2012-003418 A | | 1/2012 | |
| JP | 2015-109003 A | | 6/2015 | |
| JP | 2019-053655 A | | 4/2019 | |
| JP | 2019-167094 A | | 10/2019 | |
| JP | 2020-033013 A | | 3/2020 | |
| WO | WO-2017064798 A1 | * | 4/2017 | |
| WO | WO-2023072524 A1 | * | 5/2023 | |

OTHER PUBLICATIONS

Office Action dated Sep. 9, 2023 issued in the corresponding Chinese Patent Application No. 202110339601.5 with the English machine translation thereof.

\* cited by examiner

MOVING BODY CONTROL APPARATUS, MOVING BODY, AND MOVING BODY CONTROL METHOD FOR CONTROLLING A MOVING BODY TO PERFORM AN AUTOMATED LANE CHANGE BASED ON A DRIVER PREPARATION LEVEL

CROSS-REFERENCE TO RELATED APPLICATION

This application is based upon and claims the benefit of priority from Japanese Patent Application No. 2020-059998 filed on Mar. 30, 2020, the contents of which are incorporated herein by reference.

BACKGROUND OF THE INVENTION

Field of the Invention

The present invention relates to a moving body control apparatus, a moving body, and a moving body control method.

Description of the Related Art

Japanese Laid-Open Patent Publication No. 2019-053655 discloses determining an automated driving level in accordance with an attention level of the driver.

SUMMARY OF THE INVENTION

However, in Japanese Laid-Open Patent Publication No. 2019-053655, it is not always possible to appropriately perform a lane change.

The present invention has the objective of providing a moving body control apparatus, a moving body, and a moving body control method that make it possible to appropriately perform a lane change.

According to one aspect of the present invention, there is provided a moving body control apparatus including a judging section that judges a driving preparation level of an occupant of a moving body; and a lane change control section that approves a first lane change, which is a lane change in which a lane boundary line is crossed once, if the driving preparation level of the occupant is greater than or equal to a first level, and approves a second lane change, which is a lane change in which lane boundary lines are crossed a plurality of times, if the driving preparation level of the occupant is greater than or equal to a second level that is higher than the first level.

A moving body according to another aspect of the present invention includes the moving body control apparatus such as described above.

A moving body control method according to yet another aspect of the present invention includes a judgment step of judging a driving preparation level of an occupant of a moving body; and a lane change control step of approving a first lane change, which is a lane change in which a lane boundary line is crossed once, if the driving preparation level of the occupant is greater than or equal to a first level, and approving a second lane change, which is a lane change in which lane boundary lines are crossed a plurality of times, if the driving preparation level of the occupant is greater than or equal to a second level that is higher than the first level.

According to the present invention, it is possible to provide a moving body control apparatus, a moving body, and a moving body control method that can appropriately perform a lane change.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of a moving body control apparatus, a moving body, and a moving body control method according to the present invention will be presented and described below with reference to the accompanying drawings.

Embodiment

Figure 1:
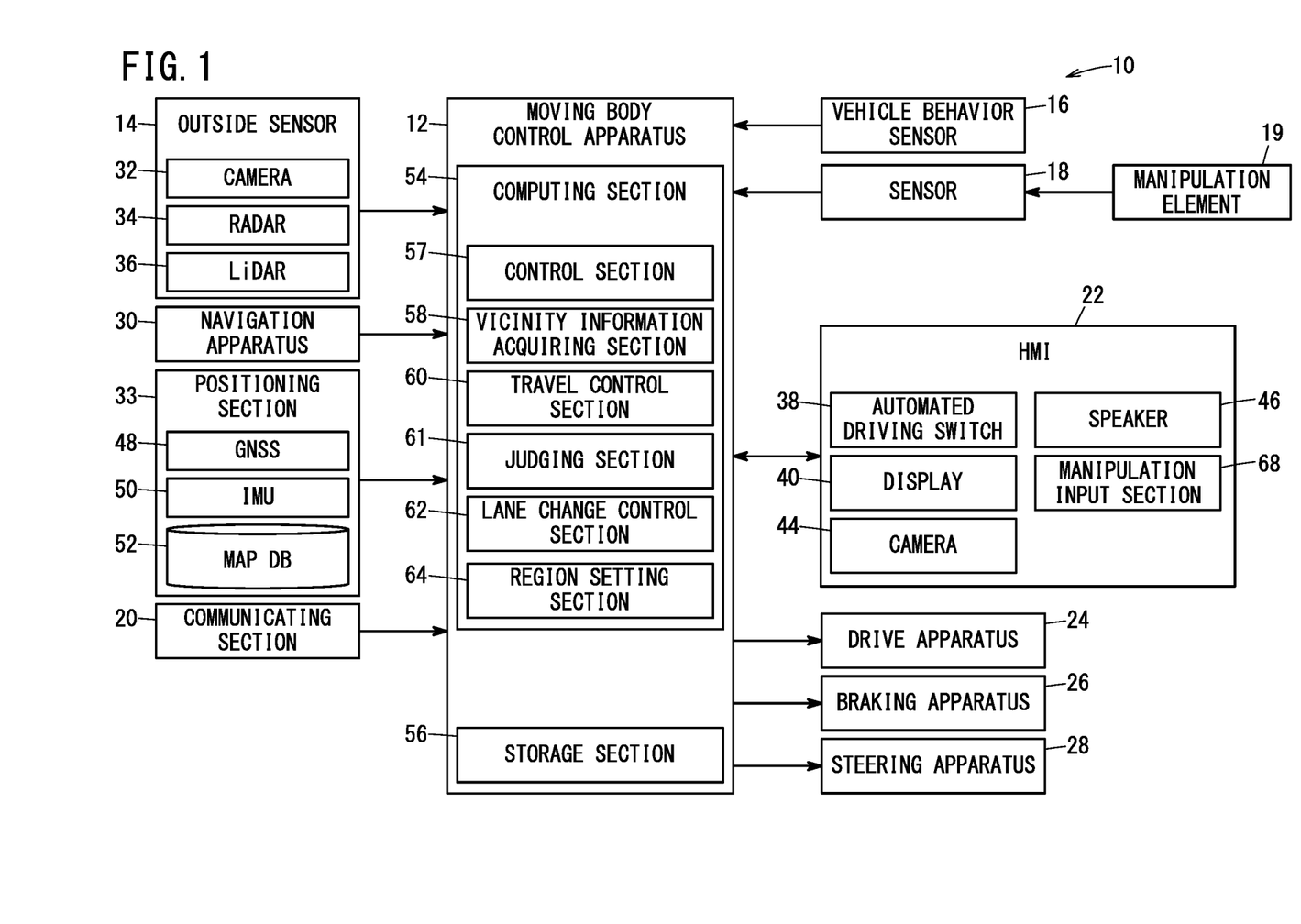
FIG. 1 is a block diagram showing a moving body including a moving body control apparatus according to an embodiment.

A moving body control apparatus, a moving body, and a moving body control method according to an embodiment will be described using drawings. FIG. 1 is a block diagram showing a moving body that includes a moving body control apparatus according to the present embodiment. Here, an example is described of a case in which the moving body 10 is a vehicle, but the moving body 10 is not limited to being a vehicle. For example, the moving body 10 may be a robot or the like.

The moving body 10 includes a moving body control apparatus 12, i.e., a moving body control ECU (Electronic Control Unit). The moving body 10 further includes an outside sensor 14, a moving body behavior sensor (vehicle behavior sensor) 16, a sensor 18, a communicating section 20, and an HMI (Human-Machine Interface) 22. The moving body 10 also includes a drive apparatus 24, a braking apparatus 26, a steering apparatus 28, a navigation apparatus 30, and a positioning section 33. The moving body 10 includes configurational elements other than the above configurational elements, but descriptions thereof are omitted.

The outside sensor 14 acquires outside information, which is information concerning the area around the moving body 10. The outside sensor 14 includes a plurality of cameras 32 and a plurality of radars 34. The outside sensor 14 also includes a plurality of LiDARs (Light Detection And Ranging, Laser Imaging Detection And Ranging) 36.

The information acquired by the cameras (imaging section) 32, i.e. camera information, is supplied from the cameras 32 to the moving body control apparatus 12. The camera information is captured image information, for example. The camera information forms outside information, together with the radar information and LiDAR information described further below. In FIG. 1, only one camera 32 is shown, but a plurality of cameras 32 are actually included.

Each radar 34 emits a transmission wave toward the outside of the moving body 10, and receives a reflected wave that comes back to the radar 34 when a portion of the emitted transmission wave is reflected by a detection object. The transmission wave may be an electromagnetic wave or the like, for example. The electromagnetic wave is a millimeter wave or the like, for example. The detection object is another moving body 70A to 70E (see FIG. 2) that is different from the moving body 10, i.e. another vehicle or the like. The radar 34 generates radar information (reflected wave signal) based on the reflected wave or the like. The radar 34 supplies the generated radar information to the moving body control apparatus 12. In FIG. 1, one radar 34 is shown, but a plurality of radars 34 are actually included in the moving body 10. The radars 34 are not limited to being millimeter wave radars. As an example, ultrasonic sensors or the like may be used as the radars 34.

Each LiDAR 36 continuously emits a laser in all directions from the moving body 10, measures the three-dimensional position of a reflection point based on reflected waves resulting from the emitted laser, and outputs information concerning this three-dimensional position, i.e. three-dimensional information. The LiDAR 36 supplies this three-dimensional information, i.e. LiDAR information, to the moving body control apparatus 12. In FIG. 1, one LiDAR 36 is shown, but a plurality of LiDARs 36 are actually included in the moving body 10.

The vehicle behavior sensor 16 acquires information concerning the behavior of the moving body 10, i.e. vehicle behavior information. The vehicle behavior sensor 16 includes a velocity sensor (not shown in the drawings), a wheel velocity sensor (not shown in the drawings), an acceleration sensor (not shown in the drawings), and a yaw rate sensor (not shown in the drawings). The velocity sensor detects the velocity of the moving body 10, i.e. the vehicle velocity. Furthermore, the velocity sensor detects the progression direction (travel direction) of the moving body 10. The wheel velocity sensor detects the velocity of the vehicle wheels (not shown in the drawings), i.e. the wheel velocity. The acceleration sensor detects the acceleration of the moving body 10. The acceleration includes the forward-rear acceleration, the lateral acceleration, and the up-down acceleration. It is acceptable for acceleration in only some of these directions to be detected by the acceleration sensor. The yaw rate sensor detects the yaw rate of the moving body 10.

The sensor (moving body manipulation sensor or driving manipulation sensor) 18 acquires information concerning driving manipulations made by an occupant (driver), i.e. driving manipulation information, based on a signal supplied from a manipulation element 19. The manipulation element 19 can be an acceleration pedal (not shown in the drawings), a brake pedal (not shown in the drawings), a steering wheel (not shown in the drawings), or the like, but is not limited to this. The sensor 18 can be an acceleration pedal sensor (not shown in the drawings), a brake pedal sensor (not shown in the drawings), a steering angle sensor (not shown in the drawings), a steering torque sensor (not shown in the drawings), or the like, but is not limited to this. The acceleration pedal sensor detects the manipulation amount of an acceleration pedal (not shown in the drawings). The brake pedal sensor detects the manipulation amount of a brake pedal (not shown in the drawings). The steering angle sensor detects the steering angle of a steering wheel (not shown in the drawings. The steering torque sensor detects the steering torque applied to the steering torque.

The communicating section 20 performs wireless communication with an external device (not shown in the drawings). The external device can be an external server or the like (not shown in the drawings), for example, but is not limited to this. The communicating section 20 may be capable or incapable of being attached to and detached from the moving body 10. Examples of a communicating section 20 that is capable of being attached to and detached from the moving body 10 include a mobile telephone, a smartphone, and the like.

The HMI 22 receives the manipulation input made by an occupant, and visually, audibly, or tactilely provides the user with various types of information. The HMI 22 can include an automated driving switch (driving assistance switch) 38, a display 40, a camera 44, a speaker 46, and a manipulation input section 68.

The automated driving switch 38 is a switch with which the occupant issues instructions to start and end automated driving. The automated driving switch 38 includes a start switch (not shown in the drawings) and an end switch (not shown in the drawings). The start switch outputs a start signal to the moving body control apparatus 12, in response to a manipulation by the occupant. The end switch outputs an end signal to the moving body control apparatus 12, in response to a manipulation by the occupant.

The display (display section) 40 includes a liquid crystal display, organic EL display, or the like, for example. Here, an example is described of a case in which the display 40 is a touch panel, but the display 40 is not limited to this.

The camera 44 captures an image of the inside of the moving body 10, i.e. the inside of the vehicle cabin (not shown in the drawings). Furthermore, the camera 44 can be provided to capture an image of the occupant. The camera 44 may be provided on the dashboard (not shown in the drawings) or on the ceiling (not shown in the drawings), for example. The camera 44 outputs information acquired by capturing the image inside the vehicle cabin, i.e. image information, to the moving body control apparatus 12.

The speaker 46 provides the occupant with various types of information using sound. The moving body control apparatus 12 outputs various notifications, warnings, and the like using the speaker 46.

The manipulation input section 68 enables the occupant to perform manipulation input to issue instructions for a lane change. In a case where a lane change proposal is made by the moving body control apparatus 12, the occupant can indicate whether they accept this lane change proposal by using the manipulation input section 68. The manipulation input section 68 is a lever-shaped manipulation element (not shown in the drawings) for example, but is not limited to this. The manipulation input section 68 is provided on a steering column (not shown in the drawings), for example, but is not limited to this. The manipulation input section 68 can pivot clockwise and counter-clockwise centered on a support shaft, for example. The manipulation input section 68 includes a manipulation position sensor (not shown in the drawings). The manipulation position sensor detects a manipulation position of the manipulation input section 68.

The manipulation input section 68 supplies information acquired by the manipulation position sensor, i.e. information concerning the manipulation position of the manipulation input section 68, to the moving body control apparatus 12 described further below. The occupant can provide instructions concerning which of a first lane change and a second lane change, described further below, is to be performed, by manipulating the manipulation input section 68. For example, the occupant can issue instructions for the first lane change by rotating the manipulation input section 68 a relatively small amount. Furthermore, the occupant can issue instructions for the second lane change by rotating the manipulation input section 68 a relatively large amount.

The drive apparatus (drive force control system) 24 includes a drive ECU (not shown in the drawings) and a drive source (not shown in the drawings). The drive ECU controls the drive force (torque) of the moving body 10 by controlling the drive source. The drive source can be an engine, a drive motor, or the like, for example. The drive ECU can control the drive force by controlling the drive source, based on manipulation of the acceleration pedal performed by the occupant. Furthermore, the drive ECU can control the drive force by controlling the drive source based on instructions supplied from the moving body control apparatus 12. The drive force of the drive source is transmitted to the vehicle wheels (not shown in the drawings) via a transmission or the like (not shown in the drawings).

The braking apparatus (braking force control system) 26 includes a braking ECU (not shown in the drawings) and a braking mechanism (not shown in the drawings). The braking mechanism causes a braking member to operate using a brake motor, hydraulic mechanism, or the like. The braking ECU can control the braking force by controlling the braking mechanism based on a manipulation of the brake pedal made by the occupant. Furthermore, the braking ECU can control the braking force by controlling the braking mechanism based on instructions supplied from the moving body control apparatus 12.

The steering apparatus (steering system) 28 includes a steering ECU (not shown in the drawings), i.e. an EPS (Electric Power Steering) system ECU, and a steering motor (not shown in the drawings). The steering ECU controls the orientation of the wheels (steered wheels) by controlling the steering motor based on a manipulation of the steering wheel, performed by the occupant. Furthermore, the steering ECU controls the orientation of the wheels by controlling the steering motor based on instructions supplied from the moving body control apparatus 12. The steering may be performed by changing the torque distribution and the braking force distribution among the left and right wheels.

The navigation apparatus 30 includes a GNSS (Global Navigation Satellite System) sensor (not shown in the drawings). Furthermore, the navigation apparatus 30 includes a computing section (not shown in the drawings) and a storage section (not shown in the drawings). The GNSS sensor detects the current position of the moving body 10. The computing section reads map information corresponding to the current position detected by the GNSS sensor, from a map database stored in the storage section. The computing section determines a target route from the current position to a destination, using this map information. The destination is input by the occupant via the HMI 22. As described above, the display 40 is a touch panel. The input of the destination is performed by having the occupant manipulate the touch panel. The navigation apparatus 30 outputs the created target route to the moving body control apparatus 12. The moving body control apparatus 12 supplies this target route to the HMI 22. The HMI 22 displays this target route in the display 40.

The positioning section 33 includes a GNSS 48. The positioning section 33 further includes an IMU (Inertial Measurement Unit) 50 and a map database (map DB) 52. The positioning section 33 identifies the position of the moving body 10 using information acquired by the GNSS 48, information acquired by the IMU 50, and the map information stored in the map database 52. The positioning section 33 can supply the moving body control apparatus 12 with self position information that is information indicating the position of the moving body 10, i.e. position information of the moving body 10. Furthermore, the positioning section 33 can supply the moving body control apparatus 12 with the map information.

The moving body control apparatus 12 includes a computing section 54 and a storage section 56. The computing section 54 performs overall control of the moving body control apparatus 12. The computing section 54 can be formed by one or more processors, for example. A CPU (Central Processing Unit), a GPU (Graphics Processing Unit), an FPGA (Field-Programmable Gate Array), a DSP (Digital Signal Processor), an ASIC (Application Specific Integrated Circuit), or the like, for example, can be used as these processors, but the processors are not limited to this. The computing section 54 can perform the control of the moving body 10 by controlling each section based on a program stored in the storage section 56.

The computing section 54 includes a control section 57, a vicinity information acquiring section 58, a travel control section 60, a judging section 61, a lane change control section 62, and a region setting section 64. The control section 57, the vicinity information acquiring section 58, the travel control section 60, the judging section 61, the lane change control section 62, and the region setting section 64 can be realized by having the computing section 54 execute a program stored in the storage section 56.

The storage section 56 includes a volatile memory (not shown in the drawings) and a non-volatile memory (not shown in the drawings). The volatile memory can be a RAM (Random Access Memory) or the like, for example. The non-volatile memory can be a ROM (Read Only Memory), a flash memory, or the like, for example. The outside information, the vehicle behavior information, the driving manipulation information, and the like are stored in the volatile memory, for example. Programs, tables, maps, and the like are stored in the non-volatile memory, for example.

The control section 57 performs overall control of the moving body control apparatus 12.

The vicinity information acquiring section 58 can acquire vicinity information of the moving body 10. This vicinity information can be supplied from the outside sensor 14, for example. The vicinity information may be acquired via the communicating section 20.

The travel control section 60 can control the travel of the moving body 10. More specifically, the travel control section 60 can control the travel of the moving body 10 based on the vicinity information acquired by the vicinity information acquiring section 58. The control of the travel of the moving body 10 can be performed based on information supplied from the navigation apparatus 30.

The judging section 61 can judge the level (or degree) of preparation that the occupant of the moving body 10 has for driving, i.e., the driving preparation level. For example, when the occupant of the moving body 10 is sitting in the driver's seat (not shown in the drawings), the judging section 61 can judge that the driving preparation level of this occupant is greater than or equal to a level D, but the judging is not limited to this. As another example, when the occupant of the moving body 10 is in a state where he/she can immediately take over the driving as the situation demands, the judging section 61 can judge that the driving preparation level of this occupant is greater than or equal to a level C, but the judging is not limited to this. More specifically, when the occupant of the moving body 10 has their eyes open and is not in a state of immobility, the judging section 61 can judge that the driving preparation level of this occupant is greater than or equal to a level C, but the judging is not limited to this. As another example, when the occupant of the moving body 10 is observing their surroundings, the judging section 61 judge that the driving preparation level of this occupant is greater than or equal to a level B, but the judging is not limited to this. More specifically, when the occupant of the moving body 10 is looking at the area around the moving body 10, the judging section 61 can judge that the driving preparation level of this occupant is greater than or equal to a level B, but the judging is not limited to this. As another example, when the occupant of the moving body 10 reacts to a prescribed notification made via the HMI 22, the judging section 61 can judge that the driving preparation level of this occupant is greater than or equal to a level A, but the judging is not limited to this. The level A is higher than the level B, the level B is higher than the level C, and the level C is higher than the level D. The judging section 61 can judge the driving preparation level of the occupant based on information supplied from the camera 44 that captures an image of the occupant of the moving body 10, but the judging is not limited tot this. The judging section 61 may judge the driving preparation level of the occupant based on information supplied from the sensor 18 or the like included in the manipulation element 19 that is manipulated by the occupant of the moving body 10.

The lane change control section 62 can control lane changing of the moving body 10. More specifically, the lane change control section 62 can perform an automatic lane change (Auto Lane Changing). The lane change control section 62 can make a lane change proposal to the occupant and perform a lane change if this lane change proposal is accepted by the occupant, but is not limited to this. The lane change control section 62 may automatically perform a lane change without making a lane change proposal to the occupant. Furthermore, a lane change may be performed based on lane change instructions provided by the occupant. When a lane change is to be performed, the lane change control section 62 can provide the occupant with information indicating that the lane change will be performed, using the display 40, the speaker 46, and the like, for example.

Figure 2:
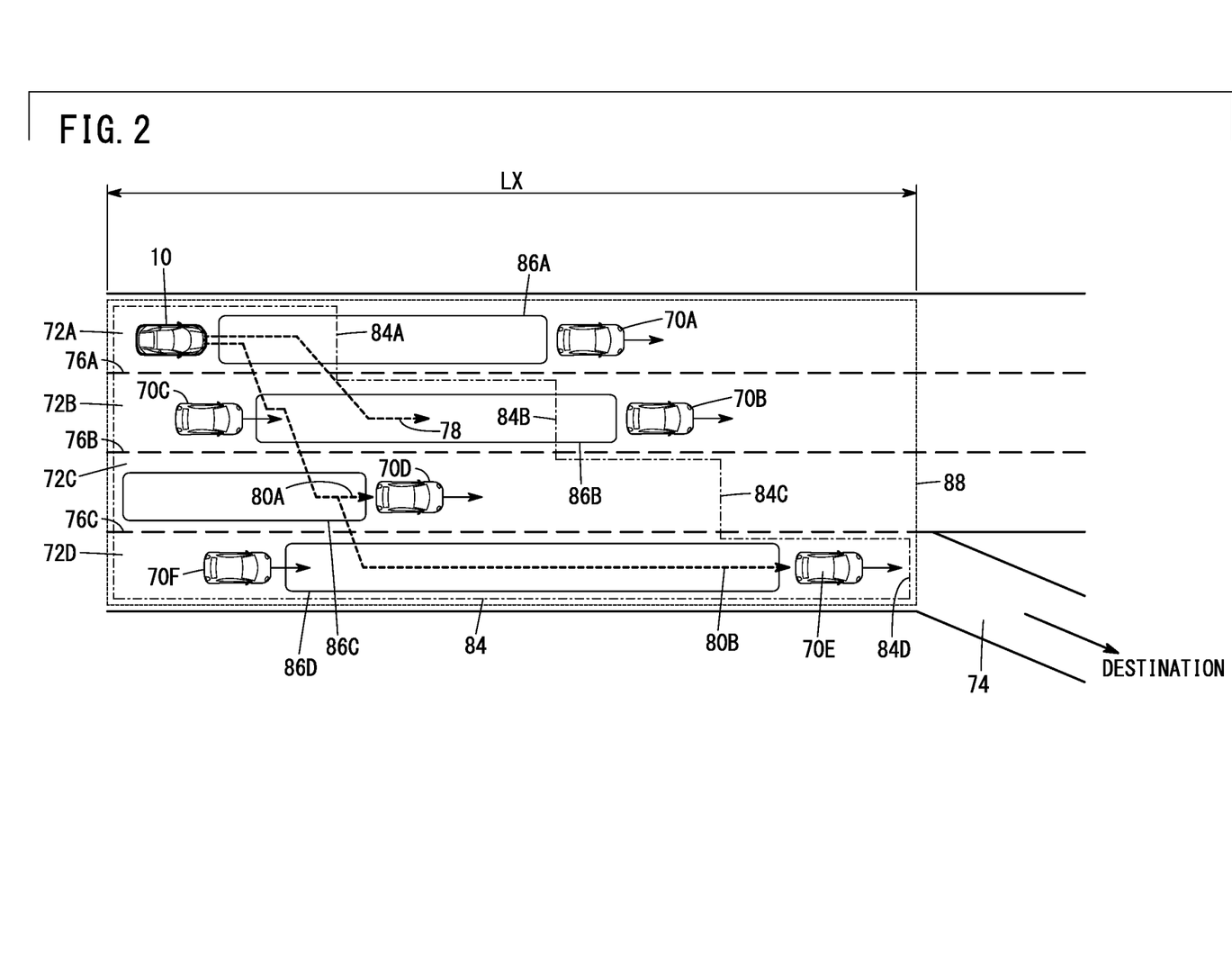
FIG. 2 is a diagram showing an example of travel lanes.

FIG. 2 is a diagram showing an example of travel lanes. In the example shown in FIG. 2, a lane 72A, a lane 72B that is adjacent to the lane 72A, a lane 72C that is adjacent to the lane 72B, and a lane 72D that is adjacent to the lane 72C are shown. When describing the lanes in general, the reference numeral 72 is used, and when describing each lane individually, the reference numerals 72A to 72D are used. In the example shown in FIG. 2, the moving body 10 is travelling in the lane 72A, i.e. the user lane. In the example shown in FIG. 2, the lane 72D is connected to a branching lane 74. The branching lane 74 is a lane leading to a destination. Lane boundary lines 76A to 76C, i.e., lane markers, are provided between the plurality of lanes 72A to 72D. When describing the lane boundary lines in general, the reference numeral 76 is used, and when describing each of the lane boundary lines individually, the reference numerals 76A to 76C are used. In the example shown in FIG. 2, another moving body 70A is travelling in lane 72A, and this other moving body 70A is positioned ahead of the moving body 10. Furthermore, in the example shown in FIG. 2, other moving bodies 70B and 70C are travelling in the lane 72B. The other moving body 70B is positioned ahead of the moving body 10. The other moving body 70C is positioned behind the moving body 70B. In the example of FIG. 2, another moving body 70D is travelling in the lane 72C. This other moving body 70D is positioned ahead of the moving body 10. In the example of FIG. 2, other moving bodies 70E and 70F are travelling in the lane 72D. The other moving body 70E is positioned ahead of the moving body 10. The other moving body 70F is positioned behind the other moving body 70E. When describing the other moving bodies in general, the reference numeral 70 is used, and when describing each other moving body individually, the reference numerals 70A to 70F are used. Here, an example is described of a case in which the other moving bodies 70 are other vehicles, but the other moving bodies 70 are not limited to this. The other moving bodies 70 may be robots or the like.

The lane change control section 62 can perform the first lane change and the second lane change. The first lane change and the second lane change are both automatic lane changes. The first lane change is a lane change that involves crossing a lane boundary line 76 only once. For example, the first lane change can be a lane change 78 in which the travel lane of the moving body 10 is changed from the lane 72A to the lane 72B. The second lane change is a lane change that involves crossing lane boundary lines 76 a plurality of times. For example, the second lane change can be a lane change 80A in which the travel lane of the moving body 10 is changed from the lane 72A to the lane 72C. In this lane change 80A, after the travel lane of the moving body 10 has been changed from the lane 72A to the lane 72B, the travel lane of the moving body 10 is then quickly changed from the lane 72B to the lane 72C. In other words, in this lane change 80A, a change of the travel lane is performed twice in series. Furthermore, the second lane change can be a lane change 80B in which the travel lane of the moving body 10 is changed from the lane 72A to the lane 72D. In this lane change 80B, after the travel lane of the moving body 10 has been changed from the lane 72A to the lane 72B, the travel lane of the moving body 10 is then quickly changed from the lane 72B to the lane 72C, and then after this, the travel lane of the moving body 10 is changed from the lane 72C to the lane 72D. In other words, in this lane change 80B, a change of the travel lane is performed three times in series. As described above, the lane 72D is connected to the branching lane 74. After the travel lane of the moving body 10 has been changed from the lane 72C to the lane 72D, the moving body 10 can travel to the branching lane 74 that leads to the destination.

When the driving preparation level of the occupant of the moving body 10 is greater than or equal to the level D (third level) and less than the level C (first level), the lane change control section 62 can approve automated driving that does not involve changing lanes. In such a case, the lane change control section 62 approves neither the first lane change nor the second lane change. As described above, the first lane change is a lane change in which a lane boundary line 76 is crossed once. As described above, the second lane change is a lane change in which lane boundary lines 76 are crossed a plurality of times.

When the driving preparation level of the occupant of the moving body 10 is greater than or equal to the level C and less than the level B (second level), the lane change control section 62 can approve the first lane change. In such a case, the lane change control section 62 denies the second lane change.

When the driving preparation level of the occupant of the moving body 10 is greater than or equal to the level B and less than the level A (fourth level), the lane change control section 62 can approve the second lane change. In such a case, the lane change control section 62 can also approve the first lane change. In other words, when the second lane change can be approved, the first lane change can also be approved.

When the driving preparation level of the occupant of the moving body 10 is greater than or equal to the level A, the lane change control section 62 can approve the lane change to the branching lane 74 that leads to the destination. When the lane change to the branching lane 74 leading to the destination can be approved, the first lane change and the second lane change can also be approved.

When the driving preparation level of the occupant of the moving body 10 becomes less than the level B and greater than or equal to the level C after the second lane change has been approved, the lane change control section 62 can deny the second lane change and approve the first lane change.

The level C may be changed based on the number of other moving bodies 70 positioned in the vicinity of the moving body 10. Furthermore, the level B may be changed based on the number of other moving bodies 70 positioned in the vicinity of the moving body 10. For example, if the number of other moving bodies 70 positioned in the vicinity of the moving body 10 is greater than or equal to a first prescribed number set for the first lane change, the level B may be increased by a first prescribed level. Furthermore, if the number of other moving bodies 70 positioned in the vicinity of the moving body 10 is greater than or equal to a second prescribed number set for the second lane change, the level C may be increased by a second prescribed level. On the other hand, if the number of other moving bodies 70 positioned in the vicinity of the moving body 10 is less than or equal to a third prescribed number set for the first lane change, the level B may be decreased by a third prescribed level. Furthermore, if the number of other moving bodies 70 positioned in the vicinity of the moving body 10 is less than or equal to a fourth prescribed number set for the second lane change, the level C may be decreased by a fourth prescribed level.

After a second lane change that has been started based on the acceptance of the occupant of the moving body 10 is suspended, if the second lane change returns from being suspended to a state of being performable within a first prescribed time and the driving preparation level of the occupant is greater than or equal to the level B, the lane change control section 62 performs control such as described below. That is, in such a case, the lane change control section 62 can approve the second lane change without reacquiring the approval of the occupant of the moving body 10.

The lane change control section 62 can generate a travel lane plan according to setting of the destination by the occupant. This travel lane plan is not a plan that indicates a very precise travel path, but is instead a plan that has a certain degree of freedom with regard to a front-rear direction (travel direction of the moving body 10). For example, in the example shown in FIG. 2, a travel lane plan such as shown below can be generated by the lane change control section 62. First, a lane change is performed to position the moving body 10 in the region between the other moving body 70B and the other moving body 70C. After this, a lane change is performed to position the moving body 10 in the region behind the other moving body 70D. After this, a lane change is performed to position the moving body 10 in the region between the other moving body 70E and the other moving body 70F. In this way, the travel lane plan generated by the lane change control section 62 is a plan that has a certain degree of freedom with regard to the front-rear direction. When the moving body 10 is travelling in a travelled region 86, which is a region that was travelled through by another moving body 70 less than a second prescribed time ago and thereafter has not been travelled through (i.e., a second prescribed time has not yet elapsed since another moving body travelled through the travelled region), according to the lane travel plan, the lane change control section 62 can approve the second lane change if the driving preparation level of the occupant is greater than or equal to the level B.

The region setting section 64 can set an automated lane change region 84, which is a region in which an automated lane change can be permitted, based on the vicinity information acquired by the vicinity information acquiring section 58. Furthermore, the region setting section 64 can further set a manual lane change region 88, which is a region in which it is possible to manually perform a lane change. The automated lane change region 84 and the manual lane change region 88 can be set as shown in FIG. 2, for example, in a range where the distance to the branching lane 74 leading to the destination is less than a prescribed distance LX. As shown in FIG. 2, the automated lane change region 84 is smaller than the manual lane change region 88. The automated lane change region 84 is included in the manual lane change region 88. The reason for the automated lane change region 84 being smaller than the manual lane change region 88 is that a certain amount of time is necessary to comprehend the situation in the vicinity of the moving body 10, generate the movement route of the moving body 10 during the lane change, steer the moving body 10, and the like.

As shown in FIG. 2, the end points 84A to 84C of the automated lane change region 84 are positioned closer to the moving body 10 the farther the lanes containing the respective end points are from the lane 72D connected to the branching lane 74 leading to the destination. That is, the end point 84B of the automated lane change region 84 in the lane 72B is positioned closer to the moving body 10 in the travel direction than the end point 84C of the automated lane change region 84 in the lane 72C. The end point 84A of the automated lane change region 84 in the lane 72A is positioned closer to the moving body 10 in the travel direction than the end point 84B of the automated lane change region 84 in the lane 72B.

The judging section 61 can determine the travelled regions 86A to 86D, which are regions that another moving body 70 travelled through less than a second prescribed time ago and thereafter has not travelled through. When describing the travelled regions in general, the reference numeral 86 is used, and when describing each individual travelled region, the reference numerals 86A to 86D are used. When the moving body 10 travels through a travelled region 86, the lane change control section 62 can perform a lane change without acquiring approval for this lane change from the occupant of the moving body 10. This is because, since another moving body 70 has already travelled through this travelled region 86, there is a low possibility of there being an obstacle or the like that would obstruct travel of the moving body 10 in this travelled region 86. When the moving body 10 travels through a region that is not a travelled region 86, the lane change control section 62 can perform a lane change based on the approval of the occupant of the moving body 10. This is because, since it has been a while since another moving body 70 travelled through this region, it is preferable for the occupant to perform a check.

Figure 3:
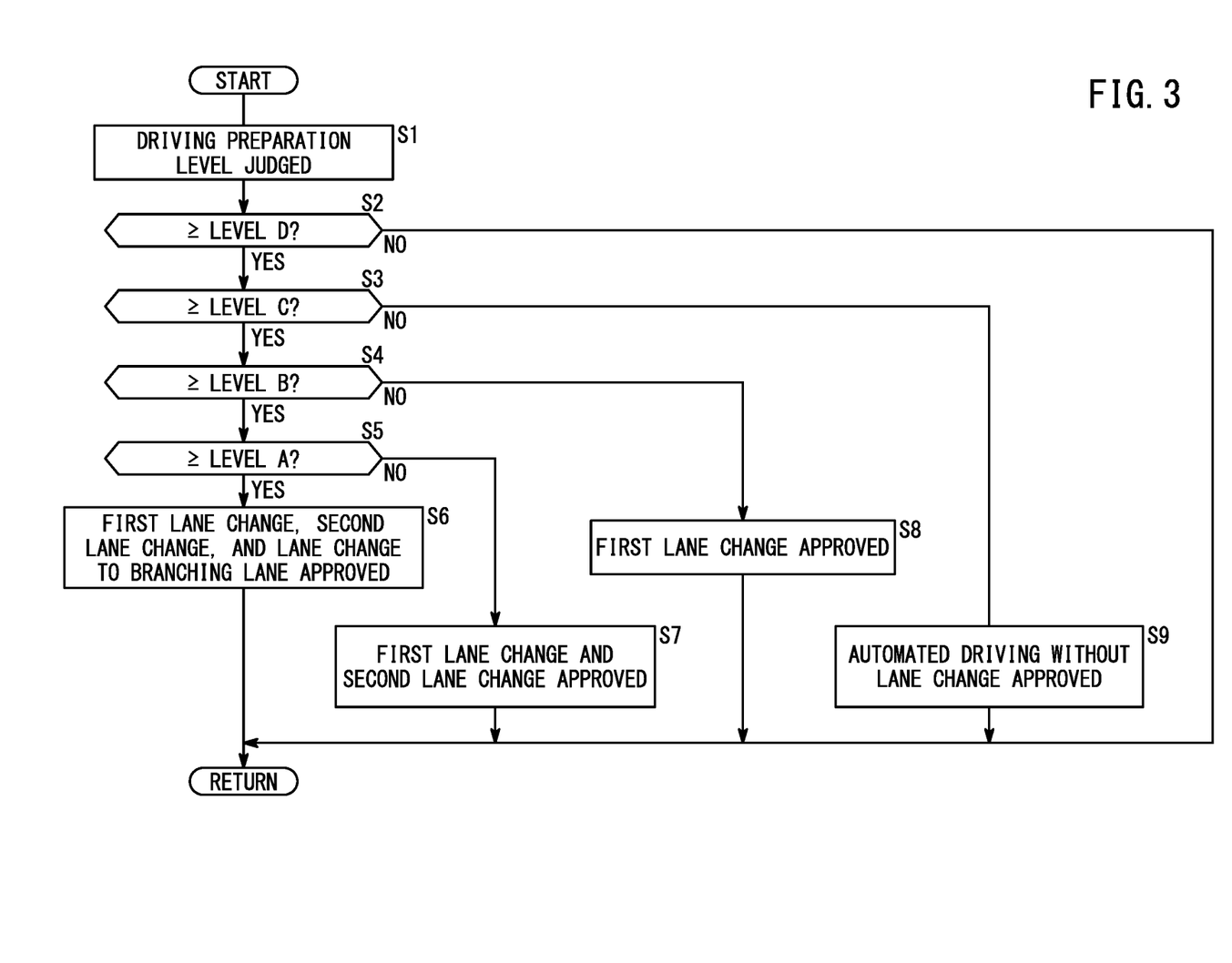
FIG. 3 is a flow chart showing an example of an operation of the moving body control apparatus according to an embodiment.

FIG. 3 is a flow chart showing an example of an operation of the moving body control apparatus according to the present embodiment.

At step S1, the judging section 61 judges the driving preparation level of the occupant of the moving body 10. After this, the process moves to step S2.

At step S2, the lane change control section 62 judges whether the driving preparation level of the occupant of the moving body 10 is greater than or equal to the level D (i.e., whether the driving preparation level≥level D). If the driving preparation level of the occupant of the moving body 10 is greater than or equal to the level D (YES at step S2), the process moves to step S3. If the driving preparation level of the occupant of the moving body 10 is less than the level D (NO at step S2), the process shown in FIG. 3 ends.

At step S3, the lane change control section 62 judges whether the driving preparation level of the occupant of the moving body 10 is greater than or equal to the level C (i.e., whether the driving preparation level≥level C). If the driving preparation level of the occupant of the moving body 10 is greater than or equal to the level C (YES at step S3), the process moves to step S4. If the driving preparation level of the occupant of the moving body 10 is less than the level C (NO at step S3), the process moves to step S9.

At step S4, the lane change control section 62 judges whether the driving preparation level of the occupant of the moving body 10 is greater than or equal to the level B (i.e., whether the driving preparation level≥level B). If the driving preparation level of the occupant of the moving body 10 is greater than or equal to the level B (YES at step S4), the process moves to step S5. If the driving preparation level of the occupant of the moving body 10 is less than the level B (NO at step S4), the process moves to step S8.

At step S5, the lane change control section 62 judges the driving preparation level of the occupant of the moving body 10 is greater than or equal to the level A (i.e., whether the driving preparation level≥level A). If the driving preparation level of the occupant of the moving body 10 is greater than or equal to the level A (YES at step S5), the process moves to step S6. If the driving preparation level of the occupant of the moving body 10 is less than the level A (NO at step S5), the process moves to step S7.

At step S6, the lane change control section 62 approves the first lane change, the second lane change, and the lane change to the branching lane 74.

At step S7, the lane change control section 62 approves the first lane change and the second lane change.

At step S8, the lane change control section 62 approves the first lane change.

At step S9, the lane change control section 62 approves automated driving that does not involve a lane change. After this, the process shown in FIG. 3 ends.

Figure 4:
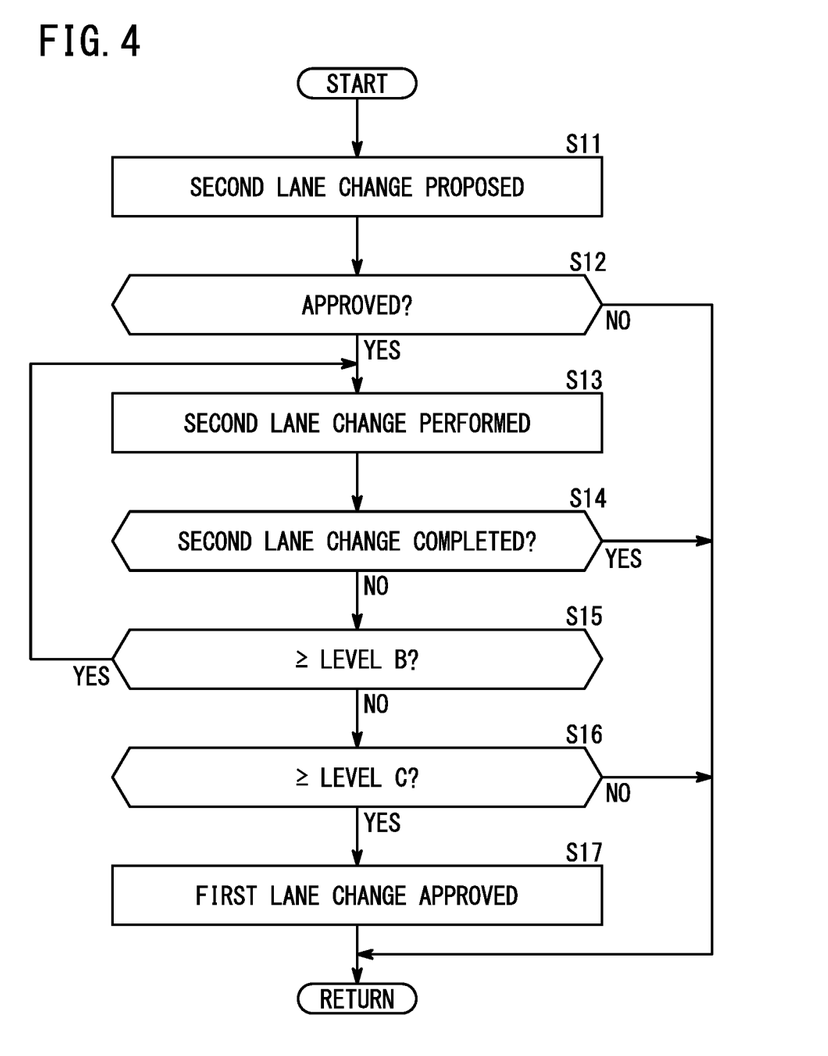
FIG. 4 is a flow chart showing an example of an operation of the moving body control apparatus according to an embodiment.

FIG. 4 is a flow chart showing an example of an operation of the moving body control apparatus according to the present embodiment. FIG. 4 shows an operation in a case where, at a stage when the second lane change has been started based on the approval of the occupant but has not yet been completed, the driving preparation level of the user drops.

At step S11, the lane change control section 62 makes a second lane change proposal. After this, the process moves to step S12.

At step S12, the lane change control section 62 judges whether this second lane change proposal has been approved by the occupant of the moving body 10. If this second lane change proposal has been approved by the occupant of the moving body 10 (YES at step S12), the process moves to step S13. If this second lane change proposal is not approved by the occupant of the moving body 10 (NO at step S12), the process shown in FIG. 4 ends.

At step S13, the lane change control section 62 performs the second lane change. After this, the process moves to step S14.

At step S14, the lane change control section 62 judges whether the second lane change has been completed. If the second lane change has been completed (YES at step S14), the process shown in FIG. 4 ends. If the second lane change has not been completed (NO at step S14), the process moves to step S15.

At step S15, the lane change control section 62 judges whether the driving preparation level of the occupant of the moving body 10 is greater than or equal to the level B (i.e., whether the driving preparation level≥level B). If the driving preparation level of the occupant of the moving body 10 is greater than or equal to the level B (YES at step S15), the processing from step S13 onward is repeated. If the driving preparation level of the occupant of the moving body 10 is less than the level B (NO at step S15), the process moves to step S16.

At step S16, it is judged whether the driving preparation level of the occupant of the moving body 10 is greater than or equal to the level C (i.e., whether the driving preparation level≥level C). If the driving preparation level of the occupant of the moving body 10 is greater than or equal to the level C (YES at step S16), the process moves to step S17. If the driving preparation level of the occupant of the moving body 10 is less than the level C (NO at step S16), the process shown in FIG. 4 ends.

At step S17, the lane change control section 62 approves the first lane change. After this, the process shown in FIG. 4 ends.

Figure 5:
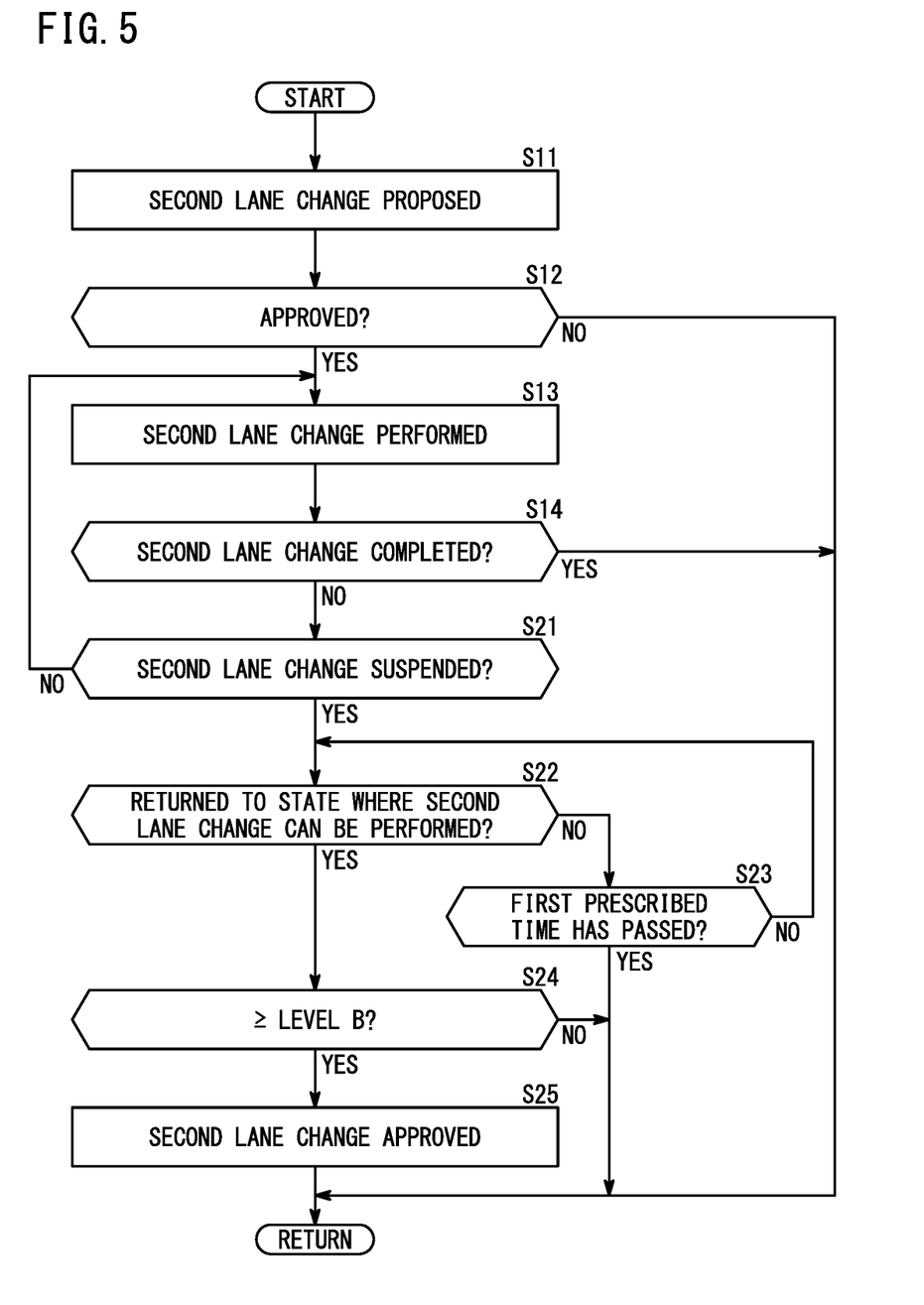
FIG. 5 is a flow chart showing an example of an operation of the moving body control apparatus according to an embodiment.

FIG. 5 is a flow chart showing an example of an operation of the moving body control apparatus according to the present embodiment. FIG. 5 shows an example of an operation in a case where the second lane change that was started based on the approval of the occupant is suspended, and then the moving body 10 returned to a state in which the second lane change can be performed.

Steps S11 to S14 are the same as steps S11 to S14 described above using FIG. 4, and therefore descriptions thereof are omitted. If the second lane change has been completed (YES at step S14), the process shown in FIG. 5 ends. If the second lane change has not been completed (NO at step S14), the process moves to step S21.

At step S21, the lane change control section 62 judges whether the second lane change has been suspended. The cause for suspending the second lane change can be that another moving body 70 is positioned in the movement path of the moving body 10 during the lane change or the like, for example. If the second lane change has been suspended (YES at step S21), the process moves to step S22. If the second lane change has not been suspended (NO at step S21), the processing from step S13 onward is repeated.

At step S22, the lane change control section 62 judges whether a state in which it is possible to perform the second lane change has been returned to. If a state in which it is possible to perform the second lane change has been returned to (YES at step S22), the process moves to step S24. If a state in which it is possible to perform the second lane change has not been returned to (NO at step S22), the process moves to step S23.

At step S23, the lane change control section 62 judges whether a first prescribed time has passed from when the second lane change was suspended. If the first prescribed time has passed from when the second lane change was suspended (YES at step S23), the process shown in FIG. 5 ends. If the first prescribed time has not passed from when the second lane change was suspended (NO at step S23), the processing from step S22 onward is repeated.

At step S24, the lane change control section 62 judges whether the driving preparation level of the occupant of the moving body 10 is greater than or equal to the level B (i.e., whether the driving preparation level≥level B). If the driving preparation level of the occupant of the moving body 10 is greater than or equal to the level B (YES at step S24), the process moves to step S25. If the driving preparation level of the occupant of the moving body 10 is less than the level B (NO at step S24), the process shown in FIG. 5 ends.

At step S25, the lane change control section 62 approves the second lane change. After this, the process shown in FIG. 5 ends.

Figure 6:
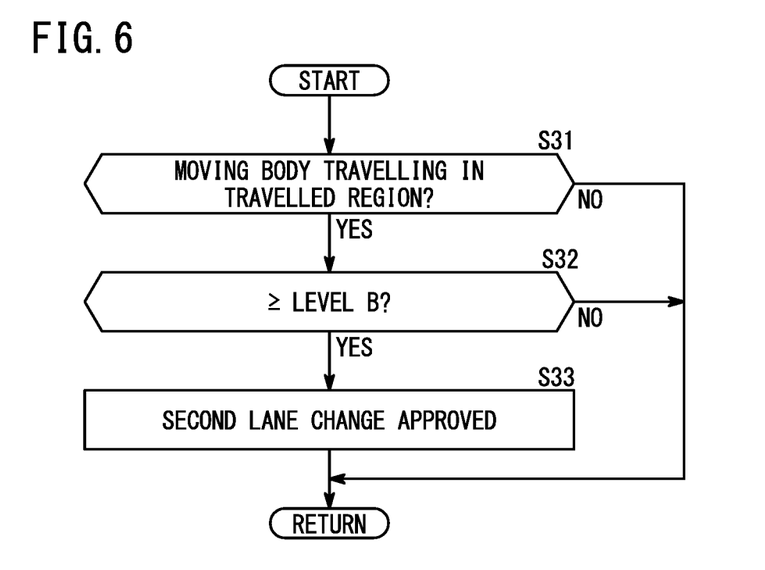
FIG. 6 is a flow chart showing an example of an operation of the moving body control apparatus according to an embodiment.

FIG. 6 is a flow chart showing an example of an operation of the moving body control apparatus according to the present embodiment. FIG. 6 shows an example of an operation in a case where the moving body 10 travels within the travelled region 86.

At step S31, the lane change control section 62 judges whether the moving body 10 is travelling in a travelled region 86. As described above, the travelled region 86 is a region in which another moving body 70 has travelled less than a second prescribed time ago. If the moving body 10 is travelling in the travelled region 86 according to the travel lane plan (YES at step S31), the process moves to step S32. If the moving body 10 is not travelling in a travelled region 86 (NO at step S31), the process shown in FIG. 6 ends.

At step S32, the lane change control section 62 judges whether the driving preparation level of the occupant of the moving body 10 is greater than or equal to the level B (i.e., whether the driving preparation level≥level B). If the driving preparation level of the occupant of the moving body 10 is greater than or equal to the level B (YES at step S32), the process moves to step S33. If the driving preparation level of the occupant of the moving body 10 is less than the level B (NO at step S32), the process shown in FIG. 6 ends.

At step S33, the lane change control section 62 approves the second lane change. After this, the process shown in FIG. 6 ends.

In this way, according to the present embodiment, when the driving preparation level of the occupant of the moving body 10 is greater than or equal to the level C, i.e., greater than or equal to the first level, the first lane change, which is a lane change in which a lane boundary line 76 is crossed once, can be approved. Furthermore, when the driving preparation level of the occupant of the moving body 10 is greater than or equal to the level B, i.e., greater than or equal to the second level, the second lane change, which is a lane change in which lane boundary lines 76 are crossed a plurality of times, can be approved. In this way, according to the present embodiment, it is possible to approve a type of lane change corresponding to the driving preparation level of the occupant of the moving body 10. Therefore, according to the present embodiment, it is possible to provide the moving body control apparatus 12 that can appropriately perform the lane change.

Preferred embodiments of the present invention are described above, but the present invention is not limited to the above-described embodiments, and various alterations can be adopted therein without departing from the scope of the present invention.

The following is a summary of the embodiments described above.

A moving body control apparatus (12) includes a judging section (61) that judges a driving preparation level of an occupant of a moving body (10); and a lane change control section (62) that approves a first lane change, which is a lane change in which a lane boundary line (76A to 76C) is crossed once, if the driving preparation level of the occupant is greater than or equal to a first level (C), and approves a second lane change, which is a lane change in which lane boundary lines are crossed a plurality of times, if the driving preparation level of the occupant is greater than or equal to a second level (B) that is higher than the first level. According to such a configuration, when the driving preparation level of the occupant of the moving body is greater than or equal to the first level, the first lane change, which is a lane change in which a lane boundary line is crossed once, can be approved. When the driving preparation level of the occupant of the moving body is greater than or equal to the second level, the second lane change, which is a lane change in which lane boundary lines are crossed a plurality of times, can be approved. In other words, according to the above configuration, it is possible to approve a type of lane change corresponding to the driving preparation level of the occupant of the moving body. Therefore, according to the above configuration, it is possible to provide the moving body control apparatus that can appropriately perform a lane change.

The judging section may judge the driving preparation level of the occupant based on information supplied from a camera (44) that captures an image of the occupant.

The judging section may judge the driving preparation level of the occupant based on information supplied from a sensor (18) mounted on a manipulation element (19) that is manipulated by the occupant.

If the driving preparation level of the occupant is less than the first level and greater than or equal to a third level (D) that is lower than the first level, the lane change control section may approve automated driving that does not involve a lane change.

If the driving preparation level of the occupant is greater than or equal to a fourth level (A) that is higher than the second level, the lane change control section may approve a lane change to a branching lane (74) that leads to a destination.

If the driving preparation level of the occupant becomes less than the second level and greater than or equal to the first level after the second lane change has been approved, the lane change control section may deny the second lane change and approve the first lane change.

At least one of the first level and the second level may be changed based on the number of other moving bodies (70A to 70F) positioned in a vicinity of the moving body. According to such a configuration, it is possible to perform an appropriate lane change according to the number of other moving bodies positioned in the vicinity of the moving body.

If the second lane change started based on approval by the occupant is suspended and then a state in which the second lane change can be performed is returned to within a first prescribed time from when the second lane change was suspended, and the driving preparation level of the occupant is greater than or equal to the second level, the lane change control section approves the second lane change without reacquiring the approval by the occupant. According to such a configuration, since there is no need to get approval again from the occupant of the moving body, it is possible to contribute to a reduction in complexity.

The lane change control section may generate a travel lane plan according to setting of a destination by the occupant; and when the moving body is travelling in a travelled region according to the travel lane plan, the lane change control section may approve the second lane change if the driving preparation level of the occupant is greater than or equal to the second level, the travelled region being a region that was travelled through by another moving body less than a second prescribed time ago and thereafter has not been travelled through.

The second lane change may be a lane change performed toward only one side in a lane width direction.

A moving body includes the moving body control apparatus described above.

A moving body control method includes a judgment step (S1) of judging a driving preparation level of an occupant of a moving body; and a lane change control step (S3, S4, S6, S7) of approving a first lane change, which is a lane change in which a lane boundary line is crossed once, if the driving preparation level of the occupant is greater than or equal to a first level, and approving a second lane change, which is a lane change in which lane boundary lines are crossed a plurality of times, if the driving preparation level of the occupant is greater than or equal to a second level that is higher than the first level.

What is claimed is:

1. A moving body control apparatus comprising one or more processors that execute computer-executable instructions stored in a memory,
   wherein the one or more processors execute the computer-executable instructions to cause the moving body control apparatus to:
   receive sensor data from one or more occupant sensors in a moving body indicative of an alertness level of an occupant of the moving body;
   determine a driving preparation level of the occupant of the moving body based on the sensor data, in which the driving preparation level is determined to be a first level when sensor data exceeds a first threshold value and a second level when the sensor data exceeds a second threshold value with the second level representing a higher degree of driving preparation than the first level;
   set an automated driving control level to a first lane change approval level that allows for automated driving control including a lane change in which a lane boundary line is crossed once, if the driving preparation level is determined to be the first level, and a second lane change approval level that allows for automated driving control including a lane change in which lane boundary lines are crossed a plurality of times, if the driving preparation level is determined to be the second level; and
   control the moving body to perform an automated driving control in accordance with the set automated driving control level.

2. The moving body control apparatus according to claim 1, wherein:
   wherein the one or more occupant sensors includes a camera that captures an image of the occupant; and
   the one or more processors cause the moving body control apparatus to determine the driving preparation level of the occupant based on information supplied from the camera.

3. The moving body control apparatus according to claim 1, wherein:
   wherein the one or more occupant sensors includes a sensor mounted on a manipulation element that is manipulated by the occupant; and
   the one or more processors cause the moving body control apparatus to determine the driving preparation level of the occupant based on information supplied from the sensor mounted on the manipulation element that is manipulated by the occupant.

4. The moving body control apparatus according to claim 1, wherein:
   if the driving preparation level of the occupant is less than the first level and greater than or equal to a third level representing a lower degree of driving preparation than the first level, the one or more processors cause the moving body control apparatus to set the automated driving control level to a low maneuvers level that requires only the lower degree of driving preparation than the driving preparation level required for the first lane change approval level.

5. The moving body control apparatus according to claim 1, wherein:
   if the driving preparation level of the occupant is greater than or equal to a fourth level representing a higher degree of driving preparation than the second level, the one or more processors cause the moving body control apparatus to set the automated driving control level to a branching lane change approval level that allows for automated driving control including a lane change to a branching lane that leads to a destination.

6. The moving body control apparatus according to claim 1, wherein:
   if the driving preparation level of the occupant becomes less than the second level and greater than or equal to the first level after setting the automated driving control level to the second lane change approval level, the one or more processors cause the moving body control apparatus to change the automated driving control level from the second lane change approval level to the first lane change approval level.

7. The moving body control apparatus according to claim 1, wherein:
   the setting of the automated driving control level between the first lane change approval level and the second lane change approval level is based on a number of other moving bodies positioned in a vicinity of the moving body.

8. The moving body control apparatus according to claim 1, wherein:
   if the performance of the automated driving control in accordance with the second lane change approval level is started based on approval by the occupant, becomes suspended, and then becomes performable again within a first prescribed time from when the second lane change was suspended, and the driving preparation level of the occupant is greater than or equal to the second level, the one or more processors cause the moving body control apparatus to reset the automated driving control level to the second lane change approval level without reacquiring the approval by the occupant.

9. The moving body control apparatus according to claim 1, wherein:
the one or more processors cause the moving body control apparatus to generate a travel lane plan according to setting of a destination by the occupant; and
when the moving body is travelling in a travelled region according to the travel lane plan, the one or more processors cause the moving body control apparatus to set the automated driving control level to the second lane change approval level if the driving preparation level of the occupant is greater than or equal to the second level, the travelled region being a region that was travelled through by another moving body less than a second prescribed time ago and thereafter has not been travelled through.

10. The moving body control apparatus according to claim 1, wherein:
the lane change in which lane boundary lines are crossed a plurality of times is performed toward only one side in a lane width direction.

11. A moving body comprising a moving body control apparatus comprising one or more processors that execute computer-executable instructions stored in a memory,
wherein the one or more processors execute the computer-executable instructions to cause the moving body control apparatus to:
receive sensor data from one or more occupant sensors in a moving body indicative of an alertness level of an occupant of the moving body;
determine a driving preparation level of the occupant of the moving body based on the sensor data, in which the driving preparation level is determined to be a first level when sensor data exceeds a first threshold value and a second level when the sensor data exceeds a second threshold value with the second level representing a higher degree of driving preparation than the first level;
set an automated driving control level to a first lane change approval level that allows for automated driving control including a lane change in which a lane boundary line is crossed once, if the driving preparation level is determined to be the first level, and a second lane change approval level that allows for automated driving control including a lane change in which lane boundary lines are crossed a plurality of times, if the driving preparation level is determined to be the second level; and
control the moving body to perform an automated driving control in accordance with the set automated driving control level.

12. A moving body control method comprising:
receiving sensor data from one or more occupant sensors in a moving body indicative of an alertness level of an occupant of the moving body;
determining a driving preparation level of the occupant of the moving body based on the sensor data, in which the driving preparation level is determined to be a first level when sensor data exceeds a first threshold value and a second level when the sensor data exceeds a second threshold value with the second level representing a higher degree of driving preparation than the first level;
setting an automated driving control level to a first lane change approval level that allows for automated driving control including a lane change in which a lane boundary line is crossed once, if the driving preparation level is determined to be the first level, and a second lane change approval level that allows for automated driving control including a lane change in which lane boundary lines are crossed a plurality of times, if the driving preparation level is determined to be the second level; and
controlling the moving body to perform an automated driving control in accordance with the set automated driving control level.

* * * * *